US010116667B2

(12) United States Patent
Johnsrud

(10) Patent No.: US 10,116,667 B2
(45) Date of Patent: Oct. 30, 2018

(54) SYSTEM FOR CONVERSION OF AN INSTRUMENT FROM A NON-SECURED INSTRUMENT TO A SECURED INSTRUMENT IN A PROCESS DATA NETWORK

(71) Applicant: BANK OF AMERICA CORPORATION, Charlotte, NC (US)

(72) Inventor: Darrell Johnsrud, Camas, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 125 days.

(21) Appl. No.: 15/050,094

(22) Filed: Feb. 22, 2016

(65) Prior Publication Data

US 2017/0214699 A1    Jul. 27, 2017

Related U.S. Application Data

(60) Provisional application No. 62/287,293, filed on Jan. 26, 2016.

(51) Int. Cl.
*G06Q 20/40*    (2012.01)
*H04L 29/06*    (2006.01)
*H04L 9/32*    (2006.01)

(52) U.S. Cl.
CPC ........... *H04L 63/126* (2013.01); *G06Q 20/40* (2013.01); *H04L 9/3236* (2013.01); *H04L 9/3239* (2013.01); *H04L 2209/38* (2013.01)

(58) Field of Classification Search
CPC ...................................................... H04L 63/47

(Continued)

(56) References Cited

U.S. PATENT DOCUMENTS 5,671,283 A    9/1997    Michener et al.
5,835,599 A    11/1998    Buer
(Continued)

FOREIGN PATENT DOCUMENTS

WO    2014162296 A1    10/2014
WO    2015135018 A1    9/2015

OTHER PUBLICATIONS

15050094_NPL_2005; 15050094_NPL_2015; 15050094_NPL_2017, NPL_Results; Patent_Results.*

(Continued)

*Primary Examiner* — Taghi T Arani
*Assistant Examiner* — BadriNarayanan C
(74) *Attorney, Agent, or Firm* — Michael A. Springs; Moore & Van Allen PLLC; Nicholas C. Russell

(57) ABSTRACT

Embodiments of the invention are directed to a system, method, or computer program product for generating and using a block chain distributed network for facilitating the conversion of an instrument into a verified secured instrument. The block chain database comprises a distributed ledger that is updated with resource availability based on database node communication. The resource availability is compared to a distribution amount associated with an instrument presented to a receiver for resource distribution. Prior to resource distribution the block chain distributed network confirms the resource availability and marks the resources as unavailable. As such, the invention converts instrument into a verified secure instrument based on an identification of sufficient resources available in association with the instrument.

14 Claims, 7 Drawing Sheets

(58) Field of Classification Search
USPC .......................................................... 726/4
See application file for complete search history.

(56) References Cited

U.S. PATENT DOCUMENTS

| | | | |
|---|---|---|---|
| 6,073,234 A | 6/2000 | Kigo et al. | |
| 6,324,286 B1 | 11/2001 | Lai et al. | |
| 6,725,303 B1 | 4/2004 | Hoguta et al. | |
| 6,850,252 B1 | 2/2005 | Hoffberg | |
| 6,973,187 B2 | 12/2005 | Gligor et al. | |
| 7,055,039 B2 | 5/2006 | Chavanne et al. | |
| 7,092,400 B2 | 8/2006 | Malzahn | |
| 7,184,549 B2 | 2/2007 | Sorimachi et al. | |
| 7,362,859 B1 | 4/2008 | Robertson et al. | |
| 7,392,384 B2 | 6/2008 | Hopkins et al. | |
| 7,428,306 B2 | 9/2008 | Celikkan et al. | |
| 7,502,933 B2 | 3/2009 | Jakobsson et al. | |
| 7,574,401 B1* | 8/2009 | Burns ................... G06Q 40/02 705/38 |
| 7,649,992 B2 | 1/2010 | Raju et al. | |
| 7,712,657 B1* | 5/2010 | Block ............... G06Q 20/1085 235/379 |
| 7,764,788 B2 | 7/2010 | Tardo | |
| 7,979,889 B2 | 7/2011 | Gladstone et al. | |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,397,841 B1 | 2/2013 | Taylor et al. | |
| 8,396,209 B2 | 3/2013 | Schneider | |
| 8,416,947 B2 | 4/2013 | Schneider | |
| 8,458,461 B2 | 6/2013 | Tardo | |
| 8,464,320 B2 | 6/2013 | Archer et al. | |
| 8,516,266 B2 | 8/2013 | Hoffberg et al. | |
| 8,590,055 B2 | 11/2013 | Yoon et al. | |
| 8,737,606 B2 | 5/2014 | Taylor et al. | |
| 8,942,374 B2 | 1/2015 | Fujisaki | |
| 8,983,063 B1 | 3/2015 | Taylor et al. | |
| 9,004,353 B1* | 4/2015 | Block ............... G06Q 20/1085 235/379 |
| 9,059,866 B2 | 6/2015 | Bar-Sade et al. | |
| 9,083,702 B2 | 7/2015 | Wied et al. | |
| 9,092,766 B1* | 7/2015 | Bedier ................. G06Q 20/204 |
| 9,298,806 B1 | 3/2016 | Vessenes et al. | |
| 9,355,530 B1* | 5/2016 | Block .................. G07F 19/201 |
| 9,635,000 B1 | 4/2017 | Muftic | |
| 9,672,499 B2 | 6/2017 | Yang et al. | |
| 10,021,672 B2* | 7/2018 | Cole ..................... H04W 72/02 |
| 2003/0126094 A1 | 7/2003 | Fisher et al. | |
| 2003/0167329 A1* | 9/2003 | Kurakake ............. G06F 9/5044 709/226 |
| 2004/0172535 A1 | 9/2004 | Jakobsson et al. | |
| 2004/0268407 A1* | 12/2004 | Sparrell .................. G06F 1/266 725/116 |
| 2005/0256802 A1* | 11/2005 | Ammermann ......... G06Q 20/02 705/44 |
| 2009/0070241 A1* | 3/2009 | Manohar ................ G06Q 20/00 |
| 2009/0281948 A1* | 11/2009 | Carlson ................. G06Q 20/10 705/44 |
| 2010/0279653 A1 | 11/2010 | Poltorak | |
| 2011/0078073 A1* | 3/2011 | Annappindi ........... G06Q 40/02 705/38 |
| 2011/0197064 A1 | 8/2011 | Garcia Morchon et al. | |
| 2012/0066121 A1 | 3/2012 | Shahbazi et al. | |
| 2012/0271920 A1* | 10/2012 | Isaksson ............. H04L 47/2416 709/219 |
| 2012/0284175 A1* | 11/2012 | Wilson .................. G06Q 20/10 705/39 |
| 2013/0198061 A1* | 8/2013 | Dheer ................... G06Q 20/10 705/39 |
| 2013/0232056 A1 | 9/2013 | Schulman | |
| 2014/0006185 A1 | 1/2014 | Zurn et al. | |
| 2014/0089243 A1 | 3/2014 | Oppenheimer | |
| 2014/0310171 A1 | 10/2014 | Grossman et al. | |
| 2015/0172053 A1 | 6/2015 | Schwarz et al. | |
| 2015/0371224 A1* | 6/2015 | Lingappa ............... G06O 20/00 |
| 2015/0206106 A1 | 7/2015 | Yago | |
| 2015/0332283 A1 | 11/2015 | Witchey | |
| 2015/0379510 A1 | 12/2015 | Smith | |
| 2015/0379636 A1* | 12/2015 | Szabo .................... G06Q 40/04 705/4 |
| 2016/0012424 A1 | 1/2016 | Simon et al. | |
| 2016/0028552 A1 | 1/2016 | Spanos et al. | |
| 2016/0050203 A1 | 2/2016 | Hefetz | |
| 2016/0092874 A1* | 3/2016 | O'Regan ............... G06Q 20/40 705/44 |
| 2016/0125376 A1* | 5/2016 | Beatty .................. G07G 1/0009 705/72 |
| 2016/0342977 A1* | 5/2016 | Lam ....................... G06O 20/00 |
| 2016/0191243 A1* | 6/2016 | Manning ................. H04L 9/32 713/168 |
| 2016/0275461 A1 | 9/2016 | Sprague et al. | |
| 2016/0292672 A1* | 10/2016 | Fay ..................... G06Q 20/363 |
| 2016/0321654 A1 | 11/2016 | Lesavich et al. | |
| 2016/0323109 A1 | 11/2016 | McCoy et al. | |
| 2016/0342978 A1* | 11/2016 | Davis ................... G06Q 20/02 |
| 2016/0342989 A1* | 11/2016 | Davis ................. G06Q 20/385 |
| 2016/0342994 A1* | 11/2016 | Davis ................. G06Q 20/027 |
| 2017/0005804 A1 | 1/2017 | Zinder | |
| 2017/0046526 A1 | 2/2017 | Chan et al. | |
| 2017/0046664 A1 | 2/2017 | Haldenby et al. | |
| 2017/0046680 A1 | 2/2017 | Crites | |
| 2017/0091397 A1 | 3/2017 | Shah | |
| 2017/0103167 A1 | 4/2017 | Shah | |
| 2017/0103461 A1 | 4/2017 | Acuña-Rohter et al. | |
| 2017/0116693 A1* | 4/2017 | Rae ........................ G06F 21/64 |
| 2017/0132615 A1* | 5/2017 | Castinado et al. ...... G06Q 20/00 |
| 2017/0132625 A1* | 5/2017 | Kennedy ............. G06Q 20/065 |
| 2017/0132626 A1* | 5/2017 | Kennedy ............. G06Q 20/065 |
| 2017/0132630 A1* | 5/2017 | Castinado ........... G06Q 20/4014 |
| 2017/0140375 A1 | 5/2017 | Kunstel | |
| 2017/0142024 A1* | 5/2017 | Fromentoux ........... H04L 67/06 |
| 2017/0163733 A1* | 6/2017 | Grefen ................ H04L 67/1097 |
| 2017/0177855 A1* | 6/2017 | Costa Faidella ........ G06F 21/45 |
| 2017/0178131 A1 | 6/2017 | Fernandez et al. | |
| 2017/0178237 A1* | 6/2017 | Wong .................. G06Q 20/065 |
| 2017/0180134 A1* | 6/2017 | King ..................... H04L 9/3247 |
| 2017/0200137 A1* | 7/2017 | Vilmont ................. G06Q 20/10 |
| 2017/0213209 A1 | 7/2017 | Dillenberger | |
| 2017/0214675 A1* | 7/2017 | Johnsrud ................ H04L 63/08 |
| 2017/0214698 A1 | 7/2017 | Hughes et al. | |
| 2017/0220998 A1 | 8/2017 | Horn et al. | |
| 2017/0221052 A1* | 8/2017 | Sheng .................. G06Q 20/3678 |
| 2017/0223005 A1 | 8/2017 | Birgisson et al. | |
| 2017/0228447 A1 | 8/2017 | Catania et al. | |
| 2017/0230378 A1 | 8/2017 | Bliss | |
| 2017/0232300 A1 | 8/2017 | Tran et al. | |
| 2017/0235955 A1 | 8/2017 | Barkan | |
| 2017/0236407 A1 | 8/2017 | Rhoads et al. | |
| 2017/0243020 A1 | 8/2017 | Dhondse et al. | |

OTHER PUBLICATIONS

Malahov, Yanislav Georgiev, "BitAlias 1, AKA Usernames for Bitcoin, A New, Simple Naming System for Bitcoin Addresses", retrieved from the Internet:<URL: https://medium.com/bitalias-decentralized-naming-and-identity-service/bitalias-7b66bffed9d8#. ww4r3h4sn> on Mar. 12, 2017; Bringing Crypto to the People, Founder of www.aeternity.com, Jun. 6, 2015, 6 pages.

International Search Report completed on Mar. 12, 2017 and International Written Opinion completed on Mar. 11, 2017 for International application No. PCT/IB 16/01655 dated Apr. 7, 2017.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

(56) References Cited

OTHER PUBLICATIONS

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

International Search Report and Written Opinion for International Application No. PCT/US2016/061402 completed Dec. 27, 2016.

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276 Digital Currencies Principles Trends Opportunities and Risks/links/569bb91e08ae6169e5624552.pif> p. 5, 10, 12, 14.

Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

Buterin, Vitalik,"On Public and Private Blockchains", Aug. 7, 2015, https://blog.ethereum.org/2015/08/07/on-public-and-private-blockchains/.

\* cited by examiner

SYSTEM FOR CONVERSION OF AN INSTRUMENT FROM A NON-SECURED INSTRUMENT TO A SECURED INSTRUMENT IN A PROCESS DATA NETWORK

CROSS-REFERENCE OF RELATED APPLICATIONS

This application claims priority to U.S. Provisional Patent Application Ser. No. 62/287,293, filed Jan. 26, 2016, entitled "System for Conversion of an Instrument from a Non-secured Instrument to a Secured Instrument in a Process Data Network," the entirety of which is incorporated herein by reference.

BACKGROUND

Instruments, both secure and non-secure are regularly used in resource distribution. However, non-secure instruments typically require validation, authorization and confirmation via a process data network for resource distribution completion that require an intermediary or point-to-point connection. These process data networks are susceptible to time lags, availability, capacity constraints, and additional expenses.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for operatively connecting with a block chain distributed network and using the block chain distributed network for facilitating the conversion of an instrument into a valid secured instrument.

In some embodiments, the block chain database may include resource availability in an account payment system. In this way, when resources are drawn from an account, a user name and signature on a resource distribution document may serve for validation and authorization of the resource availability. In some embodiments, the system may receive an identification of a receiver receiving an instrument to complete a transaction and/or for resource distribution from a user account. In some embodiments, the instrument may be a non-secure instrument. In other embodiments, the instrument may be an instrument created as a secure instrument that may need to be validated. The instrument may include a personal check, business check, cashier's check, money order, other resource distribution vehicle, or the like.

The block chain system may describe and generate a method and attributes required for requesting resource availability of an account. In this way, the system generates an availability check. As such, the system may not store a balance associated with the account, instead the system may provide or store an explicit guarantee issued by the originating financial institution that resources are available.

The system may confirm with the receiver of the instrument that there are resources sufficient to cover the transaction in the account associated with the instrument. As such, the system may convert and validate the instrument into a secure instrument based on an identification that sufficient resources are available in the account associated with the instrument.

For example, a merchant may release a shipment based on receiving a physical check from a customer. The check may be delayed, cancelled, misappropriated, or the like. Using the invention, the customer may use an instrument that may be validated by the block chain distributed network to allow the merchant to receive a promise or guarantee of resource for the shipment. As such, being able to ship the product efficiently based on receiving the guarantee from the customer's issuing financial institution through communication with the merchant's financial institution or node associated with the block chain database.

In another example, the block chain database may identify both parties of a transaction and an underlying obligation for each party of the transaction, such as the terms of a contract between the parties or the like. In this way, a certified payment may be generated and processed to indicate that resources may be available for an amount of time based on the contract. The originating financial institution or node may back the transaction via reserved resources, a line of credit, or the like. In another example, transactions may require a letter of credit to be issued prior to completion of a transaction. The block chain database could validate the resources and authorize the transaction based on the commercial terms.

In another example, the block chain database may be used for resource availability in the completion of a real-estate transaction. As such, closing information for a real-estate transaction could be stored in a node of the block chain and a user may instruct a transfer of funds which would be identified by the node and allow for completion of the real-estate transaction.

Embodiments of the invention relate to systems, methods, and computer program products for validating resource availability using a block chain distributed network, the invention comprising: generating an availability check configuration for confirming resource availability from an originating entity; receiving, physically or electronically, an instrument for resource distribution usage by a user, wherein the instrument is received at the one or more nodes associated with the block chain distributed network, wherein the instrument is published to the block chain distributed network at the node; extracting data from the instrument including a resource distribution amount and a user associated with the instrument, wherein the data is stored at the one or more nodes; validating the instrument against the block chain distributed network, wherein validating the instrument confirms instrument validity for resource distribution; confirming resource availability for the resource distribution amount of the instrument by generating a confirmation issued by the originating entity; converting the instrument to a validated secure instrument via marking the resource distribution amount of the instrument as unavailable in the block chain distributed network; and communicating the converting to a receiver of the instrument for completion of the resource distribution.

In some embodiments, the invention further comprises confirming a lack of resource availability for the resource distribution amount of the instrument by generating a comparison of a distributed ledger with the resource availability to the resource distribution amount of the instrument, wherein the lack of resource availability is communicated to the user for alternative resource allocation.

In some embodiments, the invention further comprises storing an amount of available resources together with a token representing an account number and a token representing an account owner of an account comprising the available resources, wherein the token allows for account number identification without exposing the account number and account owner identity.

In some embodiments, generating an availability check configuration further comprises receiving updated resource fluctuation of the user from a merchant or financial institution associated with the block chain distributed network.

In some embodiments, the invention further comprises integrating the one or more nodes of the block chain distributed network into a resource distribution channel systems, wherein the integration allows the one or more nodes of the block chain distributed network to identify fluctuations in resources associated with the user and provide the real-time resource availability based on the fluctuations. In some embodiments, the resource distribution channel systems comprise a financial institution system, a receiver system, and a merchant system.

In some embodiments, receiving an instrument usage for resource distribution further comprises receiving an electronic copy of the instrument, wherein the instrument is a non-secure instrument for resource distribution that is not backed by resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
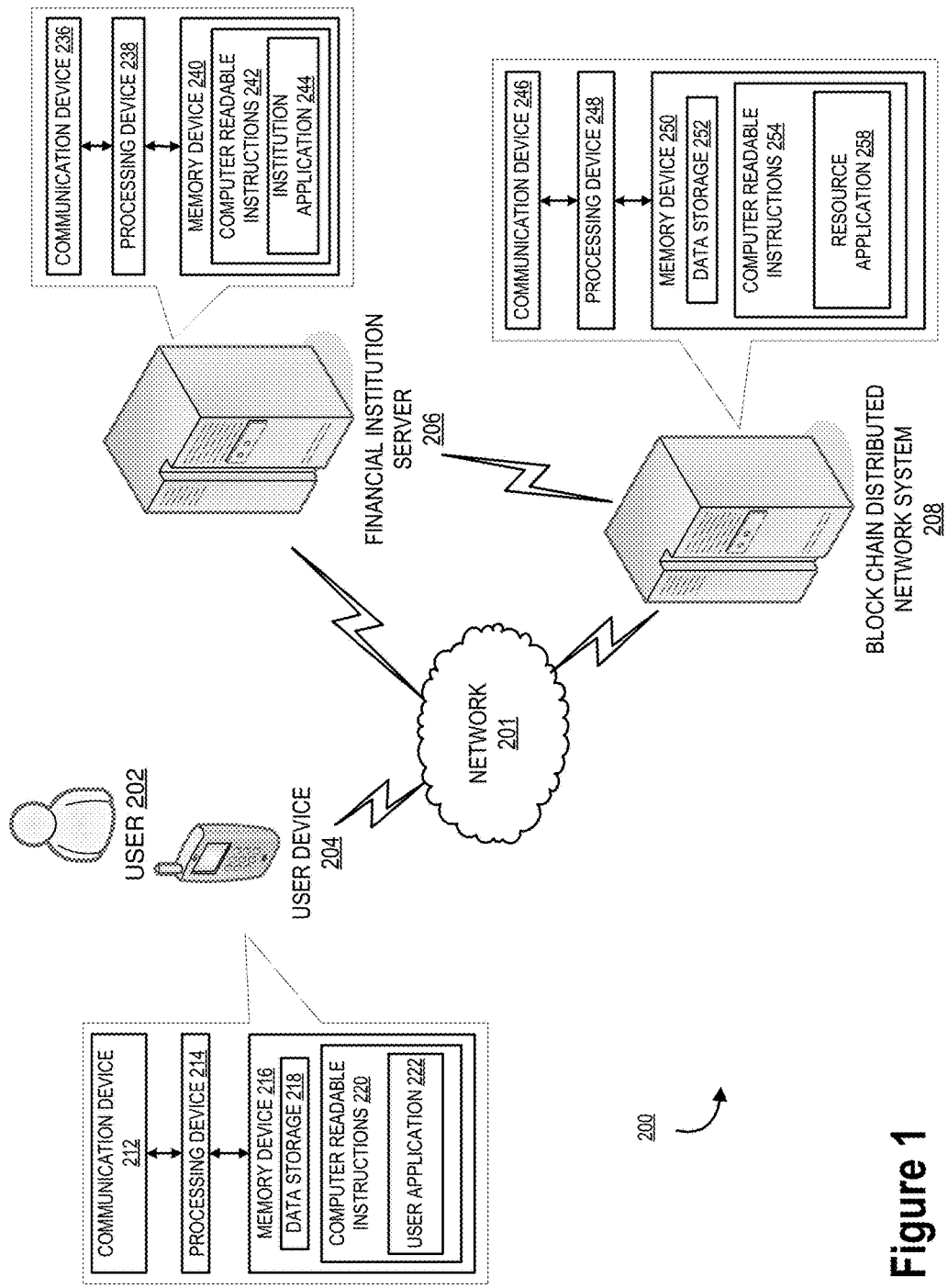
Figure 2A:
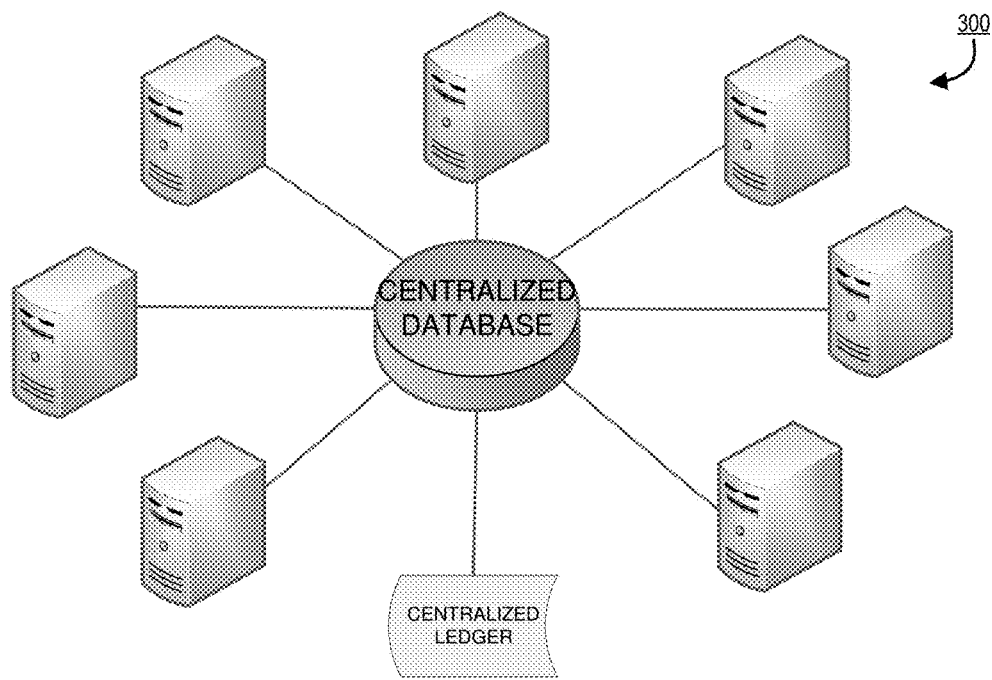
Figure 2B:
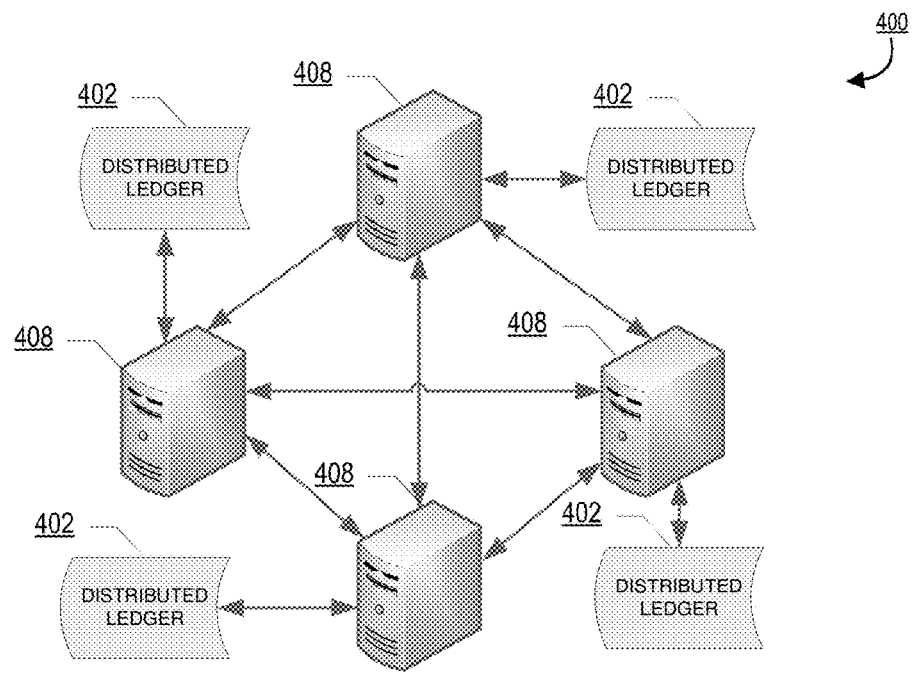
Figure 3:
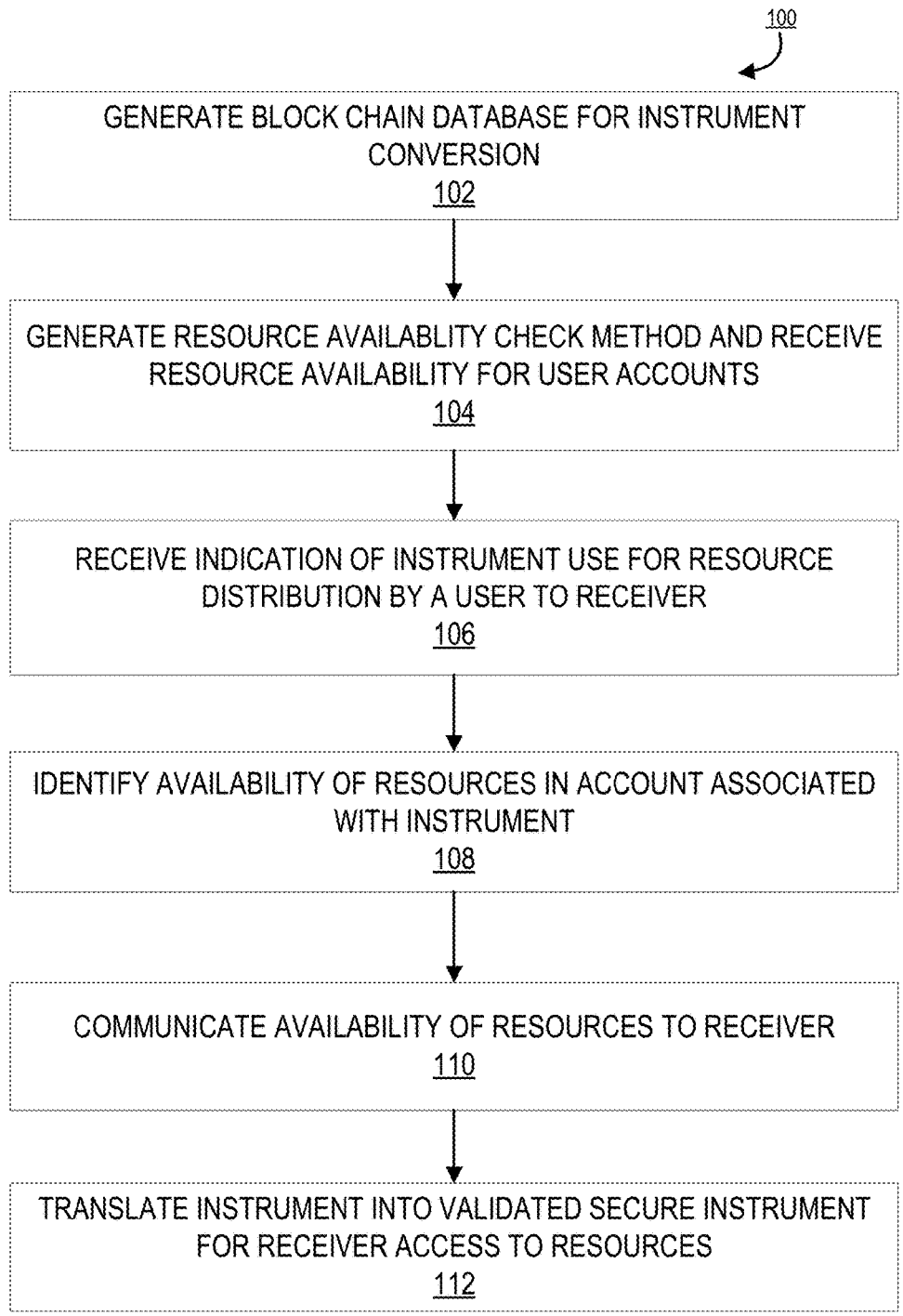
Figure 4:
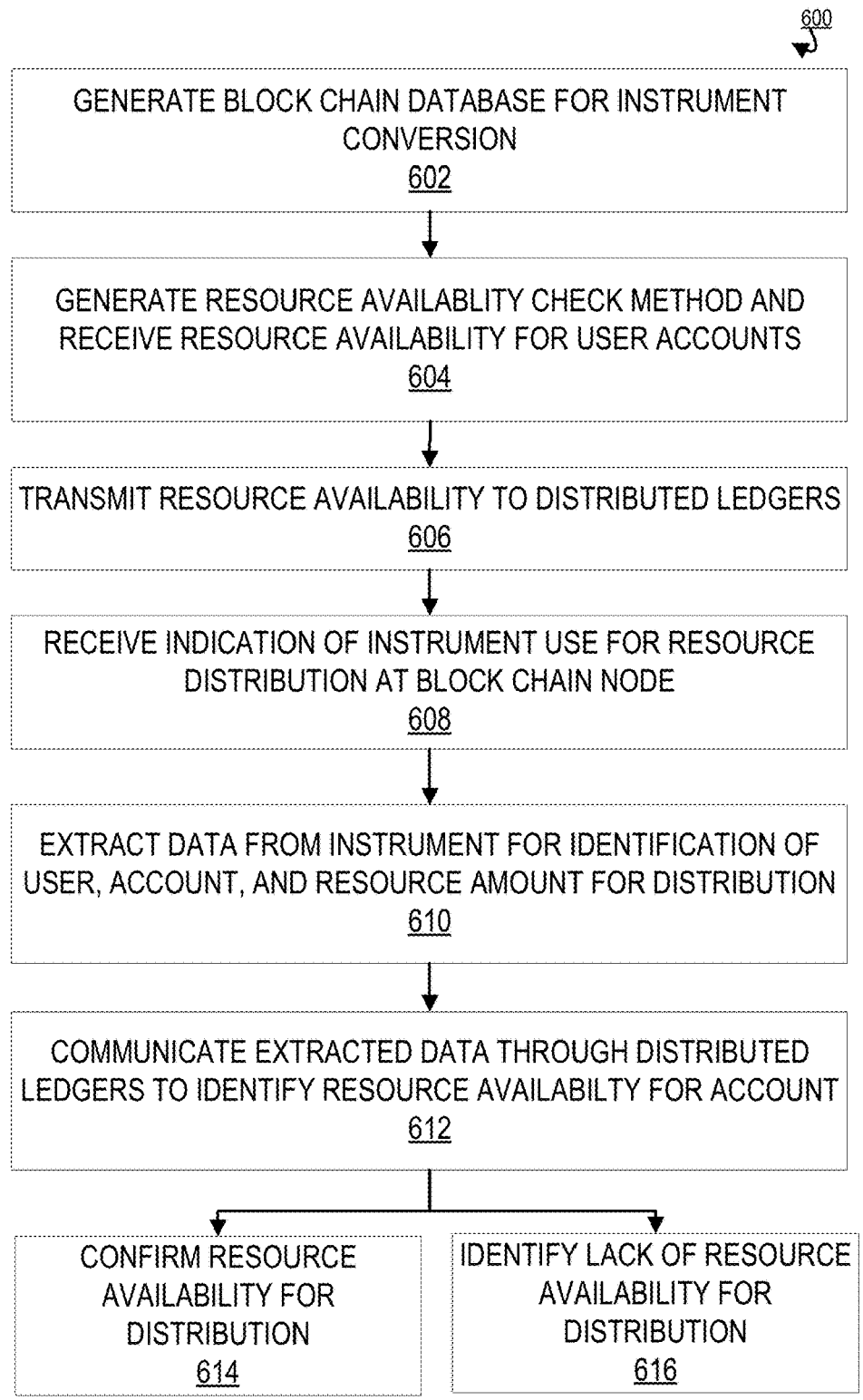
Figure 5:
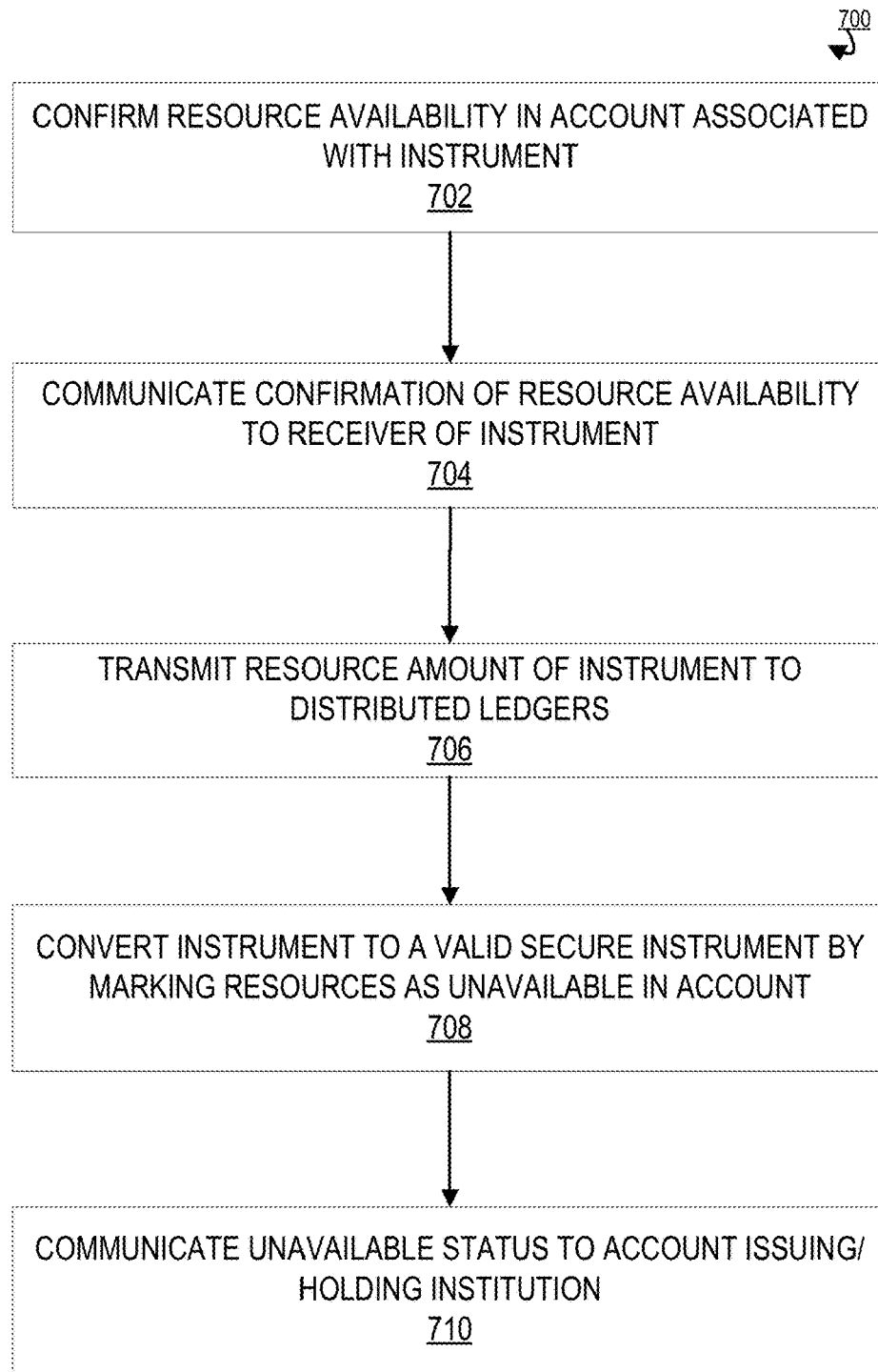
Figure 6:
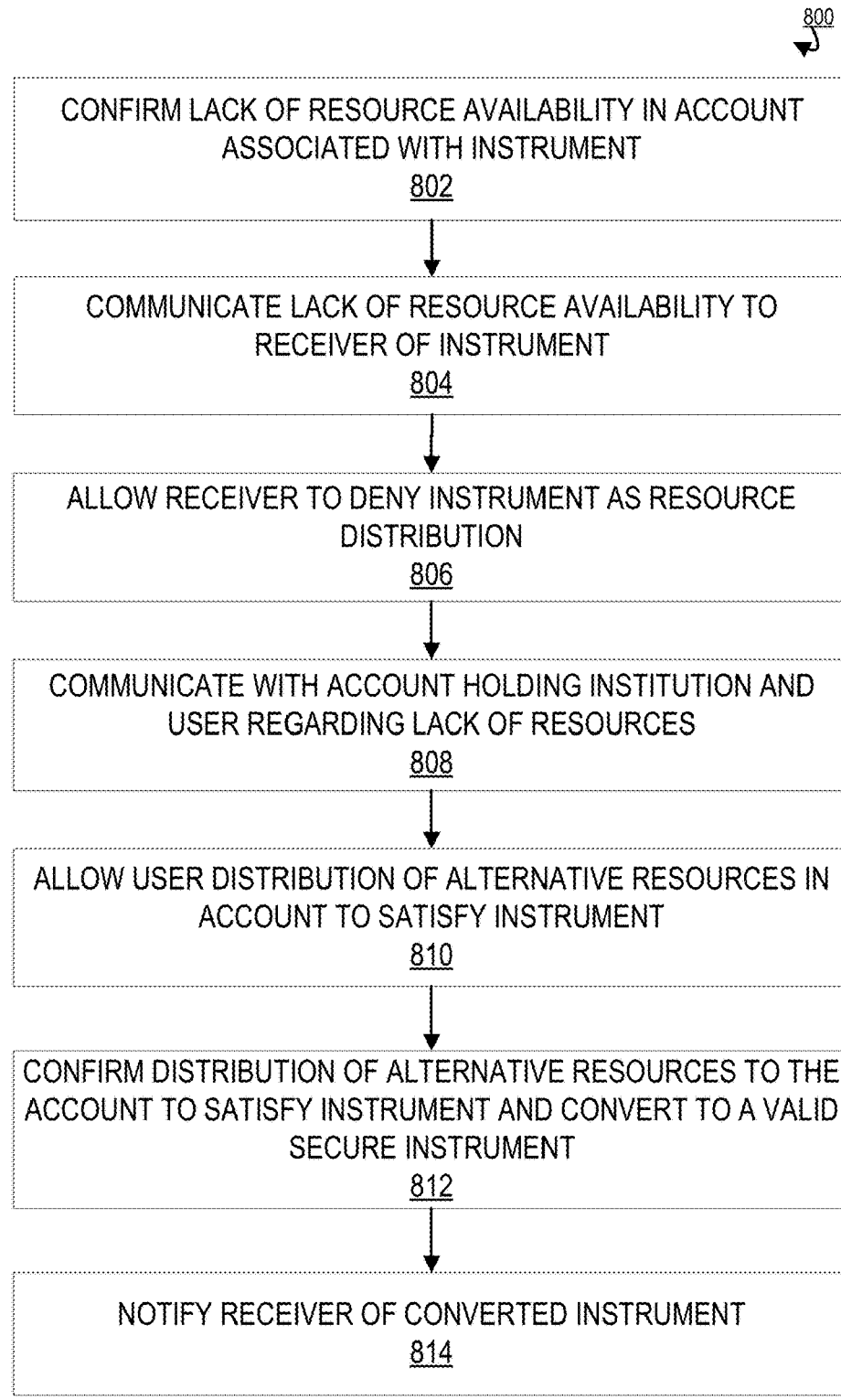
Figure 7:
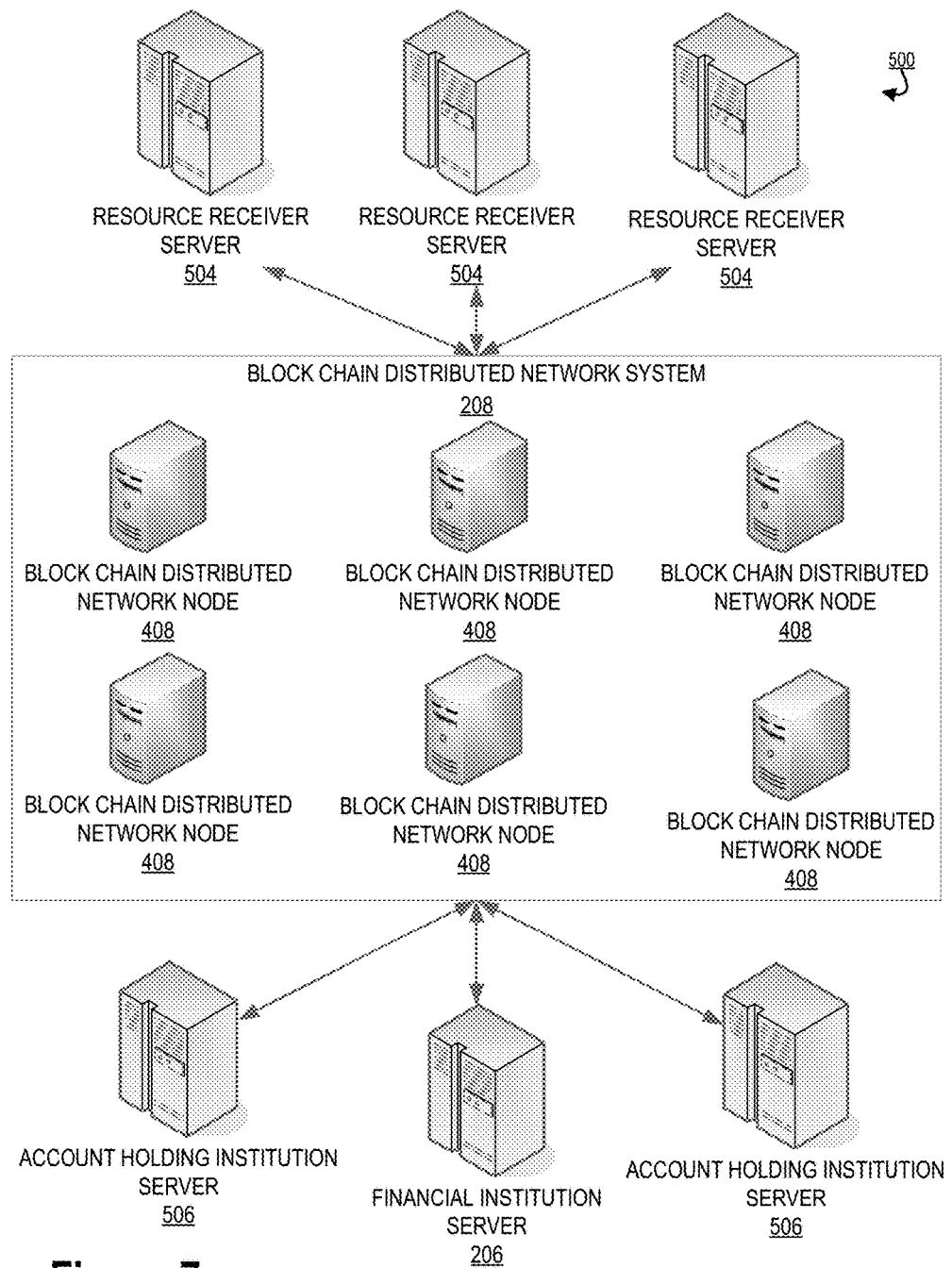

Having thus described embodiments of the invention in general terms, reference will now be made to the accompanying drawings, wherein:

FIG. 1 provides a block chain conversion system environment, in accordance with one embodiment of the present invention;

FIG. 2A provides centralized database architecture environment, in accordance with one embodiment of the present invention;

FIG. 2B provides a block chain system environment architecture, in accordance with one embodiment of the present invention;

FIG. 3 provides a high level process flow illustrating a block chain conversion of an instrument process, in accordance with one embodiment of the present invention;

FIG. 4 provides a process map illustrating the conversion of an instrument process, in accordance with one embodiment of the present invention;

FIG. 5 provides a process map illustrating the converting an instrument to a secure instrument using the block chain database, in accordance with one embodiment of the present invention;

FIG. 6 provides a process map illustrating the allocation of resources for instrument conversion, in accordance with one embodiment of the present invention; and FIG. 7 provides a process map illustrating communication channels with the block chain conversion system environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. "Funds" or "Available Balance" are a balance in an account that can be invested or withdrawn. For example, the funds may refer to a bank ledger balance minus the amount of any monetary checks in the process of collection. Funds may also be referred to as an available balance, a collected balance, good funds, and usable funds.

A "transaction" or "resource distribution" refers to any communication between a user and the financial institution or other entity monitoring the user's activities. Alternatively, in some embodiments, the term "transaction" may be used when describing the block chain database as a transaction type of record. The transaction type records consists of the actual data stored in the block chain. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution.

A transaction may include one or more of the following: renting, selling, and/or leasing goods and/or services (e.g., groceries, stamps, tickets, digital versatile disks (DVDs), vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

A "user" may be a financial institution user (e.g., an account holder or a person who have an account (e.g., banking account, credit account, or the like)). In one aspect, a user may be any financial institution user involved in retirement planning with the financial institution or any other affiliate entities associated with the financial institution. In some embodiments, the user may be an individual who may be interested in opening an account with the financial institution. In some other embodiments, a user may be any individual who may be interested in enrolling in the retirement plan offered by the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "user" may be used interchangeably.

Furthermore, while the specification discloses an instrument for resource distribution. In some embodiments, the instrument may be a non-secure secure instrument. In other embodiments, the instrument may be an instrument created as a secure instrument that may need to be validated at a financial institution. In this way, one of ordinary skill in the art will appreciate that while a non-secure instrument is described, secure instruments may also be implemented into the process data network.

Embodiments of the present invention address the above needs and/or achieve other advantages by providing apparatuses (e.g., a system, computer program product and/or other devices) and methods for operatively connecting with a block chain distributed network and using the block chain distributed network for facilitating the conversion of an instrument into a verified secured instrument.

In some embodiments, the block chain database may include real-time resource availability for a user for one or more accounts associated with the user. In some embodiments, the system may receive an identification of a receiver receiving an instrument to complete a transaction and/or for resource distribution from a user account. In some embodiments, the instrument may be a non-secure instrument. In other embodiments, the instrument may be a secure instrument. The instrument may include a personal check, business check, money order, cashier's check, or the like. The block chain system may identify the account associated with the instrument for the transaction and identify an availability of resources associated with that account and/or associated with the token that corresponds to the account. The system may confirm with the receiver of the instrument that there are resources sufficient to cover the transaction in the account associated with the instrument. As such, the system may convert the instrument into a secure validated instrument based on an identification that sufficient resources are available in the account associated with the instrument.

Embodiments of the invention are directed to a system, method, or computer program product for a distributive network system with specialized data feeds associated with the distributive network and specific triggering events associated with the data feeds for converting an instrument for resource distribution into a secure and/or verified instrument during a transaction. Thus, the system may communicate with, store, and execute code for identification of account balances and resource availability via a block chain database architecture. Furthermore, the system may manipulate and mark resources for the instrument within the account of the user.

FIG. 1 illustrates block chain conversion system environment 200, in accordance with one embodiment of the present invention. FIG. 1 provides the system environment 200 for which the distributive network system with specialized data feeds associated with the block chain instrument conversion.

FIG. 1 provides a unique system that includes specialized servers and system communicably linked across a distributive network of nodes required to perform the functions of non-secure instrument conversion based on an identification of resource availability.

As illustrated in FIG. 1, the block chain distributed network system 208 is operatively coupled, via a network 201 to the user system 204, and to the financial institution server 206. In this way, the block chain distributed network system 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that desired to distribute resources via an instrument. In some embodiments, the user 202 has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that provide authentication for resource viewing. The processing device 214 is operatively coupled to the communication device 212 and the memory device 216. The processing device 214 uses the communication device 212 to communicate with the network 201 and other devices on the network 201, such as, but not limited to the financial institution server 206 and the block chain distributed network system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to provide authentication for resource viewing.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user system 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

Embodiments of the block chain distributed network system 208 may include multiple systems, servers, computers or the like maintained by one or many entities. FIG. 1 merely illustrates one of those systems that, typically, interacts with many other similar systems to form the block chain. In one embodiment of the invention, the block chain distributed network system 208 is operated by a second entity that is a different or separate entity from the financial institution server 206. In some embodiments, the financial institution server 206 may be part of the block chain. Similarly, in some embodiments, the block chain distributed network system 208 is part of the financial institution server 206. In other embodiments, the financial institution server 206 is distinct from the block chain distributed network system 208.

In one embodiment of the block chain distributed network system 208 the memory device 250 stores, but is not limited to, a resource application 258 and a distributed ledger. In some embodiments, the distributed ledger stores data including, but not limited to, smart contract logic and rules, such as user accounts, user account resource availability, associated logic and rules, and the like. In one embodiment of the invention, both the resource application 258 and the distributed ledger may associate with applications having computer-executable program code that instructs the processing device 248 to operate the network communication device 246 to perform certain communication functions involving described herein. In one embodiment, the computer-executable program code of an application associated with the distributed ledger and resource application 258 may also instruct the processing device 248 to perform certain logic, data processing, and data storing functions of the application.

The processing device 248 is configured to use the communication device 246 to gather data, such as data corresponding to transactions, blocks or other updates to the distributed ledger from various data sources such as other block chain network system. The processing device 248 stores the data that it receives in its copy of the distributed ledger stored in the memory device 250.

In the embodiment illustrated in FIG. 1 and described throughout much of this specification, the resource application 258 may generate a method and attribute required for requesting resource availability of with an account. In this way, the resource application 258 generates an availability check. As such, the resource application 258 may not store a balance associated with the account, but instead store an explicit guarantee issued by the originating financial institution that resources are available. As such, the resource application 258 may receive resource availability and store the availability, receive data associated with an instrument being used for resource distribution, extraction of data from the instrument, identifying resource availability for account associated with an instrument, and based on confirmation of resource availability convert the instrument to a valid secure instrument.

In some embodiments, the resource application 258 may generate a method and attribute required for requesting resource availability of with an account. In this way, the resource application 258 generates an availability check. Subsequently, the resource application 258 may receive and/or confirm with an originating entity resource availability. In this way, the block chain database connects with resource originating entities, such as account issuing entities, holding entities, and/or management entities to generate a block chain database with information about resources available to the user in one or more accounts associated with an instrument. In this way, the accounts may be a checking account, savings account, money market account, or the like. Furthermore, the resource application 258 may generate a token that is associated with the account and account number. In this way, upon communication with other systems on the network 201, the resource application 258 may communicate the token, thus not communication or displaying user account information or user names. The resource application 258 associated with the block chain distributed network system 208 maintains a list of data records, such as tokens associated with one or more accounts tied to an instrument, the security of which is enhanced by the distributed nature of the block chain. A block chain typically includes several nodes, which may be one or more systems, machines, computers, databases, data stores or the like operably connected with one another which is further illustrated below in FIG. 2B. The nodes in the block chain may be entities such as financial institutions that function as gateways for other entities.

In some embodiments, the resource application 258 may receive resource availability via a generated method and attribute for requesting resource availability for an account. In this way, account holders, account issuers, financial institutions, users 202 or the like may provide resource information to the resource application 258, such that the resource application 258 may have an indication of promise issued by the origination entity that resources for the instrument are available. As such, the resource application 258 may not store a balance associated with the account, but instead store an explicit guarantee issued by the originating financial institution that resources are available.

In some embodiments, the resource application 258 receives data associated with an instrument being used for resource distribution. As such, the resource application 258 may receive via the network 201 an electronic copy of the instrument and/or information associated with the instrument. In some embodiments, the receiver of the instrument may provide the resource application 258 with the instrument being presented to him/her for a resource transfer. In other embodiments, a user 202 may notify the resource application 258 of the use of an instrument for resource distribution. In yet other embodiments, a financial institution via a financial institution server 206 may provide the indication of an instrument being presented for resource distribution.

In some embodiments, the resource application 258 extracts of data from the instrument. As such, the information associated with the instrument is extracted by the resource application 258 via scan, text recognition, of the like. The resource application 258 may identify account numbers, resource values, user names, or the like associated with the instrument. Furthermore, the resource application 258 may correlate the account numbers and user names to tokens for that account number and user. As such, not disseminating account number and user names, but instead associating them with tokens.

In some embodiments, the resource application 258 identifies resource availability for account associated with the instrument via communication with an originating financial institution. In this way, the resource application 258 may, using the information extracted from the instrument, identify a user 202 and an account associated with the instrument and generate and/or identify a token associated therewith. The resource application 258 may identify this based on an account number associated with the instrument. The resource application 258 may associate the account number with a token. As such, the resource application 258 may utilize the token as the account number throughout the process such that at no point may the actual account number be disseminated. Subsequently, the resource application 258 may identify the resources available in the account associated with the instrument by searching the distributed ledger. Once identified, the resource application 258 compares the available resources in the account to the resource distribution request of the instrument. Thus confirming resource availability for the resource distribution.

In some embodiments, the resource application 258, based on confirmation of resource availability, converts the instrument to a verified secure instrument. As such, the resource application 258 may communicate the availability of the resources to the receiver of the instrument for resource distribution. The communication may be electronic form, such as an email, text message, or the like. Furthermore, the resource application 258 may mark the resources required to cover the instrument as unavailable in the distributed ledger for the user account. As such, converting the instrument to a verified secure instrument for resource distribution.

As illustrated in FIG. 1, the financial institution server 206 is connected to the block chain distributed network system 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the block chain distributed network system 208 to provide real-time resource availability for a user account. While the block chain distributed network system 208 may communicate with the financial institution server 206 via a secure connection generated for secure encrypted communications between the two systems for communicating a resource commitment for an instrument such that resources are allocated for the instrument and are not available for subsequent use.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes.

FIG. 2B provides a block chain system environment architecture 400, in accordance with one embodiment of the present invention. Rather than utilizing a centralized database of data for instrument conversion, as discussed above in FIG. 2A, various embodiments of the invention may use a decentralized block chain configuration or architecture as shown in FIG. 2B in order to facilitate the converting of an instrument from a non-secured or secured format to a verified secured format. Such a decentralized block chain configuration ensures accurate mapping of resources available within an account associated with an instrument. Accordingly, a block chain configuration may be used to maintain an accurate ledger of resources or funds and to provide validation of instruments transacting with those resources. For example, the block chain database may include real-time resource availability for a user for one or more accounts associated with the user. Upon receipt of an instrument for transaction from the one or more accounts, such as a personal check or the like, a merchant, individual, or the like may present the non-secure instrument to the system. The block chain system may identify the account associated with the instrument for the transaction and identify a availability of resources associated with that account. The system may confirm with the recipient of the instrument that there are resources sufficient to cover the transaction in the account associated with the instrument. As such, the system may convert the instrument into a verified secure instrument based on an identification that sufficient resources are available in the account associated with the non-secure instrument.

A block chain or blockchain is a distributed database that maintains a list of data records, such as real-time resource availability associated with one or more accounts or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the instrument and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 2B, a block chain system 400 is typically decentralized—meaning that a distributed ledger 402 (i.e., a decentralized ledger) is maintained on multiple nodes 408 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 408 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications. The block chain 400 may perform one or more of the steps or functions performed by the block chain distributed network system as discussed above with reference to FIG. 1.

In various embodiments of the invention, a block chain implementation is used to implement conversion of instruments for transaction into valid secure instruments for transaction. For payments and/or resource distribution, multiple active directories may be created. In such cases, a need exists to ensure mappings are not overloaded or redirected and in order to maintain a complete audit trail. The block chain configuration is used to index accounts and resources via mappings in all directories and maintain a full and visible audit trail. Mining is used, in some embodiments, to ensure that changes to specific mappings (e.g., mapping an alias to a financial institution and/or mapping resources in an account) are confirmed and/or have reached a predetermined level of consensus. This also ensures unauthorized users are not manipulating the directories.

An instrument for resource distribution may require that the account and resources available in the account associated with the instrument is mapped to the appropriate financial institution. This information must be universally available to everyone on the network, and the block chain configuration enables such information distribution. Furthermore, the instrument for resource distribution requires that the instrument is correctly mapped to the appropriate account. In some embodiments of the invention, such a mapping, while integral to clearing (or validating) the transaction, the mapping of the instrument to an account is maintained as private information. For example, the mapping of the instrument to an account number may be maintained at a server local to the financial institution. Thus, once a requested transaction has been placed on the public block chain, the block chain network recognizes that the instrument associated with the transaction is mapped to a particular financial institution. That financial institution's server or system connected to the block chain receives the information about the requested transaction and the instrument and can validate that the transaction may be validated by looking up the appropriate mapping of the instrument to the account and the available resources within the account. As noted, this information is not placed on the public block chain, but rather is held privately, such as on a private block chain or a "side-chain".

One advantage of using a block chain configuration for instrument conversion is the expedited conversion and an opportunity for scaling. Thousands of financial institutions and merchants or resource recipients may participate in a block chain real-time instrument conversion and, therefore, the time to validation of an instrument may be shortened. For example, a proposed transaction that is placed on the block chain may be validated by one or a predetermined number of nodes of the block chain in order for the transaction to proceed. The nodes may work as miners or "validators" in order to confirm that an account associated with an instrument being used has sufficient resources to cover an amount distributed via the instrument and is mapped to a particular, valid financial institution. This determination may be based on the fact that the financial institution that originally mapped the instrument to itself (the "originating FI") has placed it on the block chain and in some cases, has included additional information such as a key that validates the instrument. In some embodiments, the key may be a digital signature that may be coupled with additional information that makes a declaration of validity by the originating FI.

The block chain may be configured with a set of rules to dictate when and how instruments are validated as secure and resources are allocated for the instrument. In some embodiments, the rules dictate that the originating FI must approve a transaction for instruments mapped to that FI. In some embodiments, the transaction may be posted to the block chain by the originating FI as an agent for the user. In some embodiments, the rules dictate that some or all transactions may be approved by one or more validator nodes without further input from the originating FI other than the validation of the mapped instrument and resources. In some such cases, the rules dictate that the mapped instrument, when placed on the block chain also includes additional information that is useful in determining whether transactions associated with the instrument has sufficient resources to convert it to a secure instrument.

FIG. 3 provides a high level process flow illustrating a block chain conversion of an instrument process 100, in accordance with one embodiment of the present invention. As illustrated in block 102, the process 100 is initiated by generating a block chain database for instrument conversion. In this way, the system generates a block chain database that connects with resource account issuing, holding, and/or management entities to generate a block chain database with information about resources available to the user in one or more accounts associated with an instrument, such as a personal check, business check, cashier's check, or the like. In this way, the accounts may be a checking account, savings account, money market account, or the like. The instrument may include any instrument used for the allocation or distribution of resources. The block chain database generated is a decentralized block chain configuration that ensures accurate mapping of real-time resources available within an account associated with an instrument. Accordingly, a block chain configuration may be used to maintain an accurate ledger of resources or funds and to provide validation of instruments transacting with those resources. The generated block chain database maintains a list of data records, such as resource availability associated with one or more accounts tied to an instrument, the security of which is enhanced by the distributed nature of the block chain. A block chain typically includes several nodes, which may be one or more systems, machines, computers, databases, data stores or the like operably connected with one another.

Next, as illustrated in block 104 the process 100 continues by generating a resource availability check method and to subsequently receive real-time resource availability for user accounts at the block chain database. In this way, account holders, account issuers, financial institutions, or the like may provide resource information to the block chain database. As such, the system may not store a balance associated with the account, but instead store an explicit guarantee issued by the originating financial institution that resources are available. Resource availability may include funds available or a limit of a financial institution's guarantee, and/or a line of credit. In this way, the resources available may be resources available for up to an amount and valid for a time period.

As illustrated in block 106, the process 100 continues by receiving an indication of an instrument being used for resource distribution by a user to a receiver of the resources. In some embodiments, the receiver may provide the block chain database with an indication of the instrument being presented to him/her for a resource transfer. In other embodiments, a user may notify the block chain database of the use of an instrument for resource distribution. In yet other embodiments, a financial institution may provide the indication of an instrument being presented for resource distribution.

Once the indication of the instrument being used for resource distribution is received, the system may access information associated with the instrument. As such, the system may receive an electronic version on the instrument, a scan of the instrument, and/or information off of the instrument. The information associated with the instrument is then extracted and used to identify the availability of resources in the account associated with the instrument being used, as illustrated in block 108.

Next, as illustrated in block 110, once resources are identified in an account as being sufficient to cover the amount from the instrument, the system communicates the availability of the resources to the receiver of the instrument. The communication may be electronic form, such as an email, text message, or the like. Finally, as illustrated in block 112, the process 100 is completed by translating the instrument into a verified secure instrument for the receiver to access the resources.

FIG. 4 illustrates a process map for the conversion of an instrument process 600, in accordance with one embodiment of the present invention. As illustrated in block 602, the process 600 is initiated by generating a block chain database for instrument conversion. As described above with respect to FIG. 3 the generated block chain database connects with resource account issuing, holding, and/or management entities, financial institutions, and receivers of resources via instruments in order to generate a block chain database with information about resources available to the user in one or more accounts associated with instruments of the user. The block chain database generated is a decentralized block chain configuration that ensures accurate mapping of resources available within an account associated with an instrument. Accordingly, a block chain configuration may be used to maintain an accurate ledger of resources or funds and to provide validation of instruments transacting with those resources.

Next, as illustrated in block 604 the system may receive continual resource availability updates for user accounts at one or more notes of the block chain database. In this way, financial institutions, account managers, users, or the like may continually provide updates to the resource availability of accounts of the user. In some embodiments, the system may receive the updates in resource availability. In other embodiments, the system may be directly associated with the accounts or entity associated with the accounts and be integrated into the resource availability for those accounts. In yet other embodiments, the system may communicate with the account holding entity to extract real-time resource availability for one or more user accounts.

As illustrated in block 606, once the resources for each account are received by and/or extracted by the nodes of the block chain database, the resource availability is transmitted to one or more distributed ledgers. The ledgers store the account information and resources available for any instrument associated with the account.

The process 600 continues by receiving an indication of an instrument being used by a user for resource distribution, as illustrated in block 608. The indication may be received at a node associated with the block chain database. In some embodiments the indication is received from a receiver of the instrument. In some embodiments, the indication is received from the entity that issued the account associated with the instrument. In yet other embodiments, the indication is received from the user using the instrument. Along with the indication of the instrument, the node associated with the block chain database may also receive information associated with the instrument, such as an electronic copy of the instrument or the like.

As illustrated in block 610, data is extracted from the instrument for identification of the user, the account associated with the instrument, and the resource amount identified on the instrument for distribution. The system may extract and read the data from a scan, electronic copy of the instrument, text, or the like. The information, such as a user name and account number may be processed as a token such that account numbers and other account information may not be disseminated. As illustrated in block 612, the process 600 continues by communicating the extracted data through to the distributed ledgers associated with the block chain database to the generated method for resource availability to identify if resources are available in the account to satisfy the instrument distribution.

As illustrated in block 614, the system identifies that there are sufficient resources in the account associated with the instrument to provide tender for the transaction and/or resource distribution. In some embodiments, this identification is an explicit guarantee issued by the originating financial institution that the resources are available for the instrument. Subsequently, the system may convert the instrument into a verified secure instrument which is further illustrated below with respect to FIG. 5.

As illustrated in block 616, the system may identify a lack of resources available in the account associated with the instrument to provide tender for the transaction and/or resource distribution desired by the instrument. Subsequently, the system may communication the discrepancy to the user and provide follow up procedures for completing the transaction which is further illustrated below with respect to FIG. 6.

FIG. 5 illustrates a process map for converting an instrument to a verified secure instrument using the block chain database 700, in accordance with one embodiment of the present invention. As illustrated in block 702, the process 700 is initiated by confirming the resource availability in the account associated with the instrument. In this way, the system utilizes data extracted from the instrument to identify the user and the user account associated with the instrument. Once the user and the account is identified, the system may review the account in the distributed ledgers associated with the block chain database to identify if resources are available in the account to satisfy the instrument distribution. In some embodiments, this identification is an explicit guarantee issued by the originating financial institution that the resources are available for the instrument.

If the system identifies sufficient resources in the account associated with the instrument, the system may communicate a confirmation of the resource availability to the receiver of the instrument, as illustrated in block 704. The confirmation may be electronically communicated, such as by an email, text message, application programming interface (API), or communications via other electronic messaging systems.

Once the confirmation of resource availability is communicated to the receiver, the system may transmit the resource amount associated with the instrument to the distributed ledgers and/or other storage locations within the block chain database, as illustrated in block 706.

The process 700 continues after a transition of the resource amount by converting the instrument to a verified secure instrument by marking resources as unavailable in the account, as illustrated in block 708. As such, any receiver, financial institution, or the like that reviews the ledger associated with the block chain database will be notified that the resources in the particular account are unavailable. Thus, since the system marks the resources for the instrument as unavailable, the instrument may be converted to a secure instrument by the marking of the resources as unavailable in the account. In this way, the instrument becomes secure because there is a promise of resources backing the instrument as opposed to a non-secure instrument which does not necessarily have resources backing the instrument.

Finally, as illustrated in block 710 of FIG. 5, the process 700 ends by communicating the unavailable status to account issuing and/or account holding institution by applying the unavailable status to the ledger associated with the block chain database.

FIG. 6 illustrates a process map for the allocation of resources for instrument conversion 800, in accordance with one embodiment of the present invention. In this way, the system identifies a lack of resources available in the account associated with the instrument to provide tender for the transaction and/or resource distribution desired by the instrument. Subsequently, the system may communication the discrepancy to the user and provide follow up procedures for completing the transaction.

As illustrated in block 802, the process 800 illustrated in FIG. 6, the system confirms the lack of resource availability in the account associated with the instrument. Once confirmed that the resources are not sufficient enough to cover the resource transfer attempted by the instrument, the system may communicate the lack of resource availability to the receiver of the instrument, as illustrated in block 804. The communication may be provided via a secure communicable link and/or as a text, API, email, communications via other electronic messaging systems, or the like. Furthermore, the system may provide the confirmed lack of resource availability to the ledger for storage and flagging for future reconciliation.

Next, as illustrated in block 806, the process 800 allows the receiver to deny the instrument as resource distribution based on receiving the communication of a lack of resources available to the user to be able to cover the resources in the instrument transfer.

Once the block chain database has been updated and the receiver has been notified of the lack of resources, the system may communicate with the account holding institution and user regarding the lack of resources, as illustrated in block 808. Subsequently, the notification allows the user to distribute alternative resources into the account associated with the instrument to satisfy the resource distribution of the instrument, as illustrated in block 810. In this way, the user may be able to transfer resources from one or more accounts to satisfy the instrument resource distribution.

After the user applies resources from an alternative account to satisfy the instrument, the system may confirm the distribution of the alternative resources to the account associated with the instrument to satisfy the instrument, as illustrated in block 812. The confirmation may occur within the ledgers of the block chain database. As such, once the confirmation occurs, the system may convert the instrument to a valid secure instrument by allocating the resources towards the instrument.

Finally, as illustrated in block 814, the process 800 is completed by notifying the receiver of the instrument of the conversion of the instrument to a valid secure instrument.

FIG. 7 illustrates a process map for communication channels within the block chain conversion system environment 500, in accordance with one embodiment of the present invention. As illustrated in FIG. 7, the block chain distributed network 208 includes one or more block chain distributed network nodes 408. As illustrated in FIG. 7 there are four block chain distributed network nodes illustrated, however one skilled in the art will appreciate if more or less nodes were provided. The block chain distributed network nodes 408 may communicate with account holding institutions systems 506 and/or financial institution servers 206. In some embodiments an account holding institution system 506 may be associated with any entity, including a financial institution, that holds or issues resource accounts to a user. The block chain distributed network nodes 408 may be an FI that functions as a gateway for other FIs or entities on the network. As such, an entity may hold an account, but access the distributed system through a sponsor node or FI.

The account holding institution servers 506 and the financial institution servers 206 may provide data to the block chain distributed network nodes 408 via communication links in the form of packets. The data may include real-time account information including the amount of resources available in each account associated with the user. Furthermore the block chain distributed network system 208 may provide the account holing institution servers 506 and the financial institution server 206 with data about instruments used for resource distribution by a user. This communication may allow an account holing institution servers 506 and a financial institution server 206 to mark resources in user accounts as unavailable for use because the user already allocated the resources for the instrument.

As further illustrated in FIG. 7, resource receiver servicers 504 may be in communication with the block chain distributed network nodes 408. In this way, the receiver, via the resource receiver servicers 504 may communicate the receiving of an instrument from the user and receive confirmation of resource availability for the instrument.

In some embodiments the block chain distributed network nodes 408 while part of the block chain disturbed network system 208 may be integrated into or associated with a financial institution system, receiver system, merchant system, or the like. In this way, when the block chain distributed network nodes 408 is integrated into a resource distribution channel, the block chain distributed network nodes 408 may identify fluctuations in resources associated with the user and provide the real-time fluctuations to the ledger. Furthermore, the block chain distributed network nodes 408 may be coded for identification of resource distribution or fluctuation monitoring. Thus, once integrated into the resource distribution channel the block chain distributed network nodes 408 may identify the fluctuations in a resource and provide the same to the distributed ledger for updating.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 6823US1.014033.2555 | 14/942,326 | TRANSPARENT SELF-MANAGING REWARDS PROGRAM USING BLOCKCHAIN AND SMART CONTRACTS | Nov. 16, 2015 |
| 6908US1.014033.2652 | 15/041,555 | BLOCK CHAIN ALIAS FOR PERSON-TO-PERSON PAYMENTS | Feb. 11, 2016 |
| 6908USP1.014033.2556 | 62/253,935 | BLOCK CHAIN ALIAS PERSON-TO-PERSON PAYMENT | Nov. 11, 2015 |
| 6985US1.014033.2605 | 15/041,566 | BLOCK CHAIN ALIAS PERSON-TO-PERSON PAYMENTS | Feb. 11, 2016 |
| 6988US1.014033.2607 | | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6989US1.014033.2608 | | SYSTEM FOR EXTERNAL SECURE ACCESS TO PROCESS DATA NETWORK | Concurrently Herewith |
| 6990US1.014033.2609 | | SYSTEM FOR PROVIDING LEVELS OF SECURITY ACCESS TO A PROCESS DATA NETWORK | Concurrently Herewith |
| 6991USP1.014033.2610 | 62/293,585 | SYSTEM FOR SECURE ROUTING OF DATA TO VARIOUS NETWORKS FROM A PROCESS DATA NETWORK | Feb. 10, 2016 |
| 6992USP1.014033.2611 | 62/293,620 | SYSTEM FOR CENTRALIZED CONTROL OF SECURE ACCESS TO PROCESS DATA NETWORK | Feb. 10, 2016 |
| 6993US1.014033.2612 | | SYSTEM FOR CONTROL OF SECURE ACCESS AND COMMUNICATION WITH DIFFERENT PROCESS DATA NETWORKS WITH SEPARATE SECURITY FEATURES | Concurrently Herewith |
| 6994US1.014033.2613 | | SYSTEM FOR CONTROL OF DEVICE IDENTITY AND USAGE IN A PROCESS DATA NETWORK | Concurrently Herewith |
| 6996US1.014033.2615 | | SYSTEM FOR ESTABLISHING SECURE ACCESS FOR USERS IN A PROCESS DATA NETWORK | Concurrently Herewith |
| 6997US1.014033.2616 | | SYSTEM FOR ALLOWING EXTERNAL VALIDATION OF DATA IN A PROCESS DATA NETWORK | Concurrently Herewith |
| 6998USP1.014033.2617 | 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |

-continued

| Docket Number | U.S. Patent Application Ser. No. | Title | Filed On |
|---|---|---|---|
| 6999US1.014033.2720 | | SYSTEM FOR TRACKING AND VALIDATION OF MULTIPLE INSTANCES OF AN ENTITY IN A PROCESS DATA NETWORK | Concurrently Herewith |
| 6999USP1.014033.2618 | 62/287,301 | SYSTEM FOR TRACKING AND VALIDATION OF MULTIPLE INSTANCES OF AN ENTITY IN A PROCESS DATA NETWORK | Jan. 26, 2016 |
| 7000US1.014033.2721 | | SYSTEM FOR TRACKING AND VALIDATION OF AN ENTITY IN A PROCESS DATA NETWORK | Concurrently Herewith |
| 7000USP1.014033.2619 | 62/287,298 | SYSTEM FOR TRACKING AND VALIDATION OF AN ENTITY IN A PROCESS DATA NETWORK | Jan. 26, 2016 |
| 7001US1.014033.2620 | | SYSTEM FOR ROUTING OF PROCESS AUTHORIZATIONS AND SETTLEMENT TO A USER IN A PROCESS DATA NETWORK | Concurrently Herewith |
| 7002US1.014033.2621 | | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 7003US1.014033.2622 | | SYSTEM FOR GRANT OF USER ACCESS AND DATA USAGE IN A PROCESS DATA NETWORK | Concurrently Herewith |
| 7033US1.014033.2638 | | SYSTEM FOR IMPLEMENTING A DISTRIBUTED LEDGER ACROSS MULTIPLE NETWORK NODES | Concurrently Herewith |
| 7038US1.014033.2643 | | SYSTEM FOR EXTERNAL VALIDATION OF PRIVATE-TO-PUBLIC TRANSITION PROTOCOLS | Concurrently Herewith |
| 7039US1.014033.2644 | | SYSTEM FOR EXTERNAL VALIDATION OF DISTRIBUTED RESOURCE STATUS | Concurrently Herewith |
| 7040US1.014033.2645 | | SYSTEM FOR TRACKING TRANSFER OF RESOURCES IN A PROCESS DATA NETWORK | Concurrently Herewith |
| 7041US1.014033.2651 | | SYSTEM FOR MANAGING SERIALIZABILITY OF RESOURCE TRANSFERS IN A PROCESS DATA NETWORK | Concurrently Herewith |
| 7042US1.014033.2640 | | SYSTEM TO ENABLE CONTACTLESS ACCESS TO A TRANSACTION TERMINAL USING A PROCESS DATA NETWORK | Concurrently Herewith |

What is claimed is:

1. A system for validating resource availability using a block chain distributed network, the system comprising: a memory device with computer-readable program code stored thereon: a communication device; a processing device operatively coupled to the memory device and the communication device, wherein the processing device is configured to execute the computer-readable program code to:

generate an availability check configuration for confirming resource availability from an originating entity by receiving information corresponding to available resources associated with the user and updating real time resource availability of user resources on a distributed ledger shared between one or more nodes, wherein the resources associated with the user are processed to the distributed ledger as a token representing a user name and account number comprising the resource availability, wherein the token is associated with the account number via a resource application associated with a financial institution;

receive, physically or electronically, an instrument for resource distribution usage by a user, wherein the instrument is received at the one or more nodes associated with the block chain distributed network;

extract and read data from a scanned or electronic copy of the instrument including a resource distribution amount and a user associated with the instrument, wherein the data is stored at the one or more nodes;

integrate the one or more nodes of the block chain distributed network into resource distribution channel systems to identify available resources associated with the user and provide a real-time resource availability of fluctuations to the distributed ledger validate the instrument against the block chain distributed network, wherein validating the instrument confirms instrument validity for the resource distribution;

confirm resource availability for the resource distribution amount of the instrument by generating a confirmation issued by the originating entity;

marking on the distributed ledger of the block chain distributed network the resource distribution amount required as unavailable;

convert the instrument to a validated secure instrument based on marking on the block chain distributed network the resource distribution amount as unavailable; and communicate the converting to a receiver of the instrument for completion of the resource distribution.

2. The system of claim 1, further comprising confirming a lack of resource availability for the resource distribution amount of the instrument by generating a comparison of the distributed ledger with the resource availability to the resource distribution amount of the instrument, wherein the lack of resource availability is communicated to the user for alternative resource allocation.

3. The system of claim 1, further comprising storing an amount of available resources together with a token representing an account number and a token representing an account owner of an account comprising the available resources, wherein the token allows for account number identification without exposing the account number and account owner identity.

4. The system of claim 1, wherein the resource distribution channel systems comprise a financial institution system, a receiver system, and a merchant system.

5. The system of claim 1, wherein receiving an instrument usage for resource distribution further comprises receiving an electronic copy of the instrument, wherein the instrument is a non-secure instrument for resource distribution that is not backed by resources.

6. A computer program product for validating resource availability using a block chain distributed network, the computer program product comprising at least one non-transitory computer-readable medium having computer-readable program code portions embodied therein, the computer-readable program code portions comprising: first executable portion configured for generating an availability check configuration for confirming resource availability from an originating entity by receiving information corresponding to available resources associated with the user and updating real time resource availability of user resources on a distributed ledger shared between one or more nodes, wherein the resources associated with the user are processed to the distributed ledger as a token representing a user name and account number comprising the resource availability, wherein the token is associated with the account number via a resource application associated with a financial institution; second executable portion configured for receiving, physically or electronically, an instrument for resource distribution usage by a user, wherein the instrument is received at the one or more nodes associated with the block chain distributed network: third executable portion configured for extracting and reading data from a scanned or electronic copy of the instrument including a resource distribution amount and a user associated with the instrument, wherein the data is stored at the one or more nodes; fourth executable portion configured for integrating the one or more nodes of the block chain distributed network into resource distribution channel systems to identify available resources associated with the user and provide a real-time resource availability of fluctuations to the distributed ledger of the block chain distributed network; fifth executable portion configured for validating the instrument against the block chain distributed network, wherein validating the instrument confirms instrument validity for resource distribution; sixth executable portion configured for confirming resource availability for the resource distribution amount of the instrument by generating a confirmation issued by the originating entity; seventh executable portion configured for marking on the distributed ledger or the block chain distributed network the resource distribution amount required as unavailable; eighth executable portion configured for converting the instrument to a validated secure instrument based marking on the block chain distributed network the resource distribution amount as unavailable; and ninth executable portion configured for communicating the converting to a receiver of the instrument for completion of the resource distribution.

7. The computer program product of claim 6, further comprising an executable portion configured for confirming a lack of resource availability for the resource distribution amount of the instrument by generating a comparison of the distributed ledger with the resource availability to the resource distribution amount of the instrument, wherein the lack of resource availability is communicated to the user for alternative resource allocation.

8. The computer program product of claim 6, further comprising an executable portion configured for storing an amount of available resources together with a token representing an account number and a token representing an account owner of an account comprising the available resources, wherein the token allows for account number identification without exposing the account number and account owner identity.

9. The computer program product of claim 6, wherein the resource distribution channel systems comprise a financial institution system, a receiver system, and a merchant system.

10. The computer program product of claim 6, wherein receiving an instrument usage for resource distribution further comprises receiving an electronic copy of the instrument, wherein the instrument is a non-secure instrument for resource distribution that is not backed by resources.

11. A computer-implemented method for validating resource availability using a block chain distributed network, the method comprising: providing a computing system comprising a computer processing device and a non-transitory computer readable medium, where the computer readable medium comprises configured computer program instruction code, such that when said instruction code is operated by said computer processing device, said computer processing device performs the following operations: generating an availability check configuration for confirming resource availability from an originating entity by receiving information corresponding to available resources associated with the user and updating real time resource availability of user resources on a distributed ledger shared between one or more nodes, wherein the resources associated with the user are processed to the distributed ledger as a token representing a user name and account number comprising the resource availability, wherein the token is associated with the account number via a resource application associated with a financial institution; receiving, physically or electronically, an instrument for resource distribution usage by a user, wherein the instrument is received at the one or more nodes associated with the block chain distributed network; extracting and reading data from a scanned or electronic copy of the instrument including a resource distribution amount and a user associated with the instrument, wherein the data is stored at the one or more nodes; integrating the one or more nodes of the block chain distributed network into resource distribution channel systems to identify available resources associated with the user and provide a real-time resource availability of fluctuations to the distributed ledger of the block chain distributed network; validating the instrument against the block chain distributed network, wherein validating the instrument confirms instrument validity for resource distribution; confirming resource availability for the resource distribution amount of the instrument by generating a confirmation issued by the originating entity; marking on the distributed ledger of the block chain distributed network the resource distribution amount required as unavailable; converting the instrument to a validated secure instrument based on marking on the block chain distributed network the resource distribution amount as unavailable; and communicating the converting to a receiver of the instrument for completion of the resource distribution.

12. The computer-implemented method of claim 11, further comprising confirming a lack of resource availability for the resource distribution amount of the instrument by generating a comparison of the distributed ledger with the resource availability to the resource distribution amount of the instrument, wherein the lack of resource availability is communicated to the user for alternative resource allocation.

13. The computer-implemented method of claim 11, further comprising storing an amount of available resources together with a token representing an account number and a token representing an account owner of an account comprising the available resources, wherein the token allows for account number identification without exposing the account number and account owner identity.

14. The computer-implemented method of claim 11, wherein receiving an instrument usage for resource distribution further comprises receiving an electronic copy of the instrument, wherein the instrument is a non-secure instrument for resource distribution that is not backed by resources.

* * * * *